(12) United States Patent
Shirai (10) Patent No.: US 6,331,918 B1
(45) Date of Patent: Dec. 18, 2001

(54) LIGHT INTERCEPTION STRUCTURE FOR AN AUTOMATIC FOCUS DETECTION SURVEYING INSTRUMENT

(75) Inventor: Masami Shirai, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/337,351

(22) Filed: Jun. 21, 1999

(30) Foreign Application Priority Data

Jun. 23, 1998 (JP) .................................. 10-176348

(51) Int. Cl.[7] .................................. G02B 15/14
(52) U.S. Cl. .......................... 359/698; 359/696; 359/822; 359/823; 359/824; 359/825; 359/835; 356/359; 356/375; 356/495; 250/201.02; 250/203.02
(58) Field of Search .................. 250/201.02, 203.02; 359/696, 698, 822–825, 835; 356/375, 495, 359

(56) References Cited

U.S. PATENT DOCUMENTS 4,534,649 * 8/1985 Downs .................................. 356/495
5,668,674 * 9/1997 Kanai et al. .......................... 359/835
5,715,101 2/1998 Nakamura et al. .
5,856,664 1/1999 Suzuki et al. .
5,872,661 2/1999 Suzuki et al. .
5,877,892 3/1999 Nakamura et al. .
5,923,468 7/1999 Tsuda et al. .
5,936,736 * 8/1999 Suzuki et al. ........................ 356/375

* cited by examiner

*Primary Examiner*—Cassandra Spyrou
*Assistant Examiner*—Craig Curtis
(74) *Attorney, Agent, or Firm*—Greenblum & Bernstein, P.L.C.

(57) ABSTRACT

A light interception structure for an automatic focus detection surveying instrument includes a telescopic optical system having an objective optical system and an ocular optical system, a beam splitting optical element which splits object light transmitted through the objective optical system from the telescopic optical system, and a focus detector having a light receiver which receives the object light split by the beam splitting optical element. One surface of the beam splitting optical element upon which external light entering the telescopic optical system through the ocular optical system is first made incident after the external light passes through or is reflected by a beam splitting surface of the beam splitting optical element is subject to an anti-reflection treatment.

17 Claims, 12 Drawing Sheets

LIGHT INTERCEPTION STRUCTURE FOR AN AUTOMATIC FOCUS DETECTION SURVEYING INSTRUMENT

BACKGROUND OF THE INVENTION

1. Field of the Invention

The present invention relates to a light interception structure for an AF sensor of an automatic focus detection surveying instrument.

2. Description of the Related Art

In a, conventional auto-focus surveying instrument having a collimating telescope, such as a total station, an optical system is composed of a collimating optical system including an objective lens, a focusing lens, a Porro prism, a focusing plate and an eyepiece in this order from the object side, and a beam splitting optical system including a beam splitter provided in the vicinity of the Porro prism to split a light path of a focus detection optical system from a light path of the collimating optical system. In the focusing system, the focus state of a plane which is optically equivalent to a focal plane of the collimating optical system located within the focus detection optical system is detected by a phase difference detection type auto-focus sensor having a pair of CCD sensors to calculate the amount of defocus (defocus amount), so that a focusing lens is moved to a focal position in accordance with the defocus amount to carry out the automatic focusing (AF) operation.

However, in the conventional structure, since the beam splitting system and the Porro prism are located on the optical axis of the collimating optical system, if external light enters the collimating optical system through the eyepiece, the external light reaches the AF sensor due to internal reflections, so that the external light overlaps the light emitted from the objective lens, thus resulting in an incorrect focusing operation.

SUMMARY OF THE INVENTION

The primary object of the present invention is to provide an automatic focus detection surveying instrument in which light incident through the eyepiece is intercepted so as not to reach the AF sensor, so that a precise focusing operation can be carried out.

To achieve the object mentioned above, according to an aspect of the present invention, there is provided a light interception structure for an automatic focus detection surveying instrument including a telescopic optical system having an objective optical system and an ocular optical system, a beam splitting optical element which splits object light transmitted through the objective optical system from the telescopic optical system, and a focus detection device having a light receiving device for receiving the object light split by the beam splitting optical element, wherein one surface of the beam splitting optical element upon which external light entering the telescopic optical system through the ocular optical system is first made incident after the external light passes through or is reflected by a beam splitting surface of the beam splitting optical element is subject to an anti-reflection treatment.

Preferably, the anti-reflection treatment is for light diffusion.

Preferably, the anti-reflection treatment for light diffusion is surface polished.

Preferably, the surface of the beam splitting optical element which is subject to the anti-reflection treatment is coated with an anti-reflection paint.

According to another aspect of the present invention there is provided a light interception structure for an automatic focus detection surveying instrument including a telescopic optical system having an objective optical system and an ocular optical system, a beam splitting optical element which splits object light transmitted through the objective optical system from the telescopic optical system, and a focus detection device having a light receiving device for receiving the object light split by the beam splitting optical element, wherein an inner surface of the automatic focus detection surveying instrument receives emitted external light which is first made incident on and passes through the surface of the beam splitting optical element after passing through a beam splitting surface of the beam splitting optical element which allows the external light to pass through or reflect therefrom.

Preferably, one surface of the beam splitting optical element upon which external light entering the telescopic optical system through the ocular optical system is first made incident after the external light passes through or is reflected by a beam splitting surface of the beam splitting optical element is coated with an anti-reflection layer.

Preferably, the anti-reflection treatment includes an application of a fabric or cloth to the surface.

The anti-reflection treatment can be an application of a molt plane to the surface.

The anti-reflection treatment can be a coating of an anti-reflection paint.

According to another aspect of the present invention, there is provided a light interception structure for an automatic focus detection surveying instrument including a telescopic optical system having an objective optical system and an ocular optical system, a beam splitting optical element which splits object light transmitted through the objective optical system from the telescopic optical system, and a focus detection device having a light receiving device for receiving the object light split by the beam splitting optical element, wherein a reflection surface is provided in a position opposed to a surface upon which external light entering the telescopic optical system through the ocular optical system and emitted from the beam splitting optical element is first made incident after the external light is transmitted through or reflected by the beam splitting surface of the beam splitting optical element so as to reflect the external light emitted from the beam splitting optical element in a direction whereby the light does not reach the beam splitting optical element.

Preferably, the reflection surface is formed on an inner surface of a barrel of the automatic focus detection surveying instrument.

The present disclosure relates to subject matter contained in Japanese Patent Application No.10-176348 (filed on Jun. 23, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
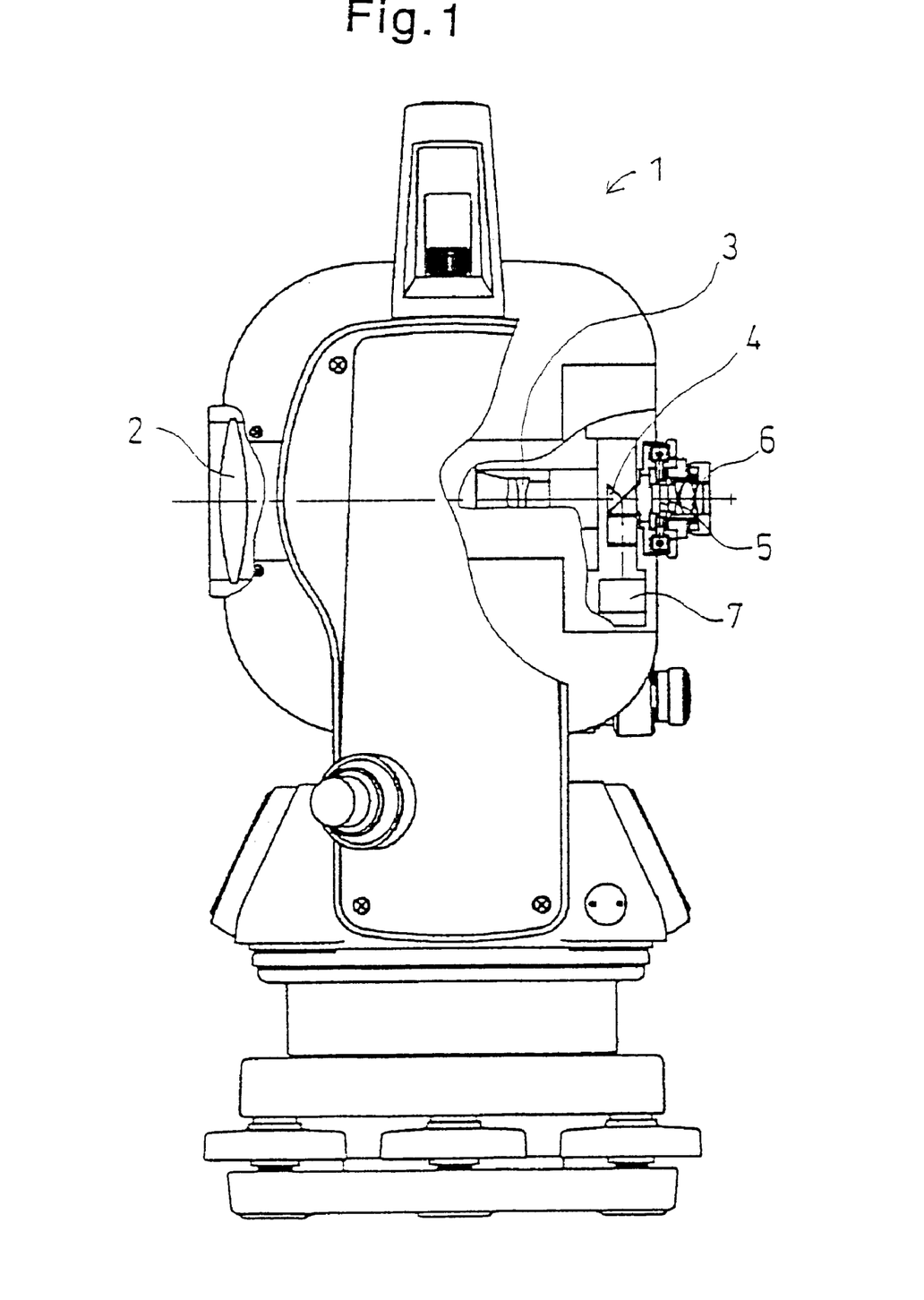
FIG. 1 is a partially cut-out side elevational view of a total station to which the present invention is applied.
Figure 2:
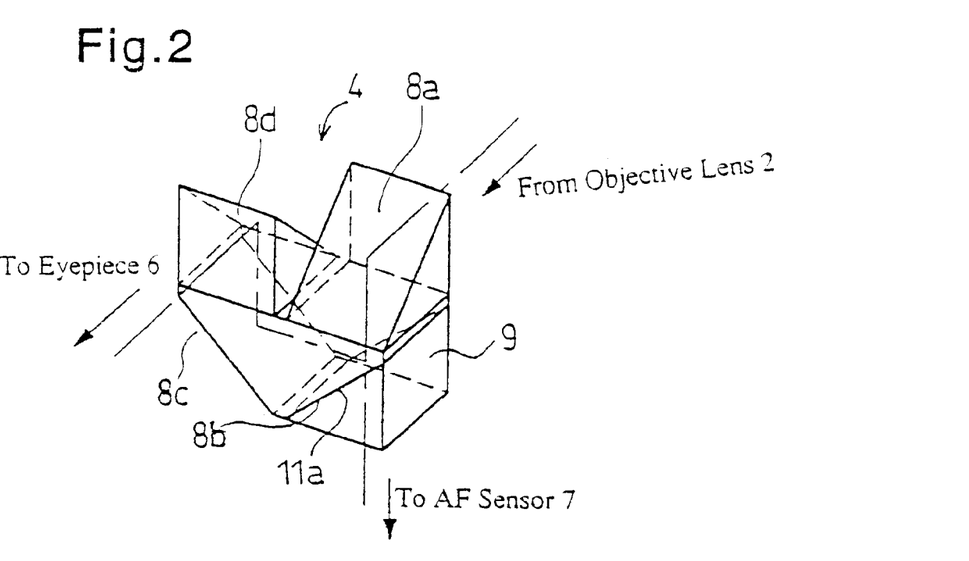
FIG. 2 is a perspective view of a Porro prism which is provided on its second reflection surface with a prism cemented thereto.

Several embodiments of the present invention will be discussed below, referring to the drawings. FIG. 1 shows a partially cut-out side view of a total station 1 to which the present invention is applied. Light from an object is transmitted through an objective lens 2 and a focusing lens 3; is reflected by four reflection surfaces of a Porro prism 4; and is converged onto a focusing plate 5 to form an erect image thereon. A user can view the erect image through an eyepiece 6. As shown in FIG. 2, a prism 9 is cemented to a second reflection surface 8b of the Porro prism 4, so that the boundary therebetween defines a beam splitting surface (coated surface) 11a. The prism 9 and the beam splitting surface 11a form a beam splitting optical element. A portion of the light incident upon the beam splitting surface 11a is transmitted therethrough and is made incident upon the AF sensor 7 through the prism 9.

Figure 7A:
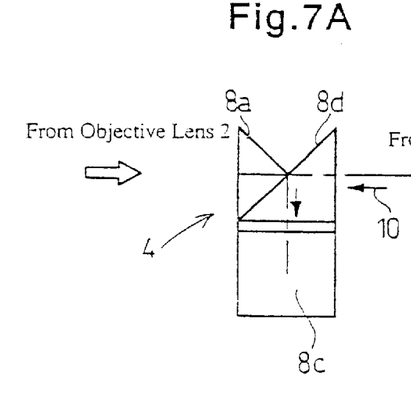
FIGS. 7A and 7B are a side elevational view and a front elevational view, of an AF sensor which receives light incident through an eyepiece, respectively.
Figure 7B:
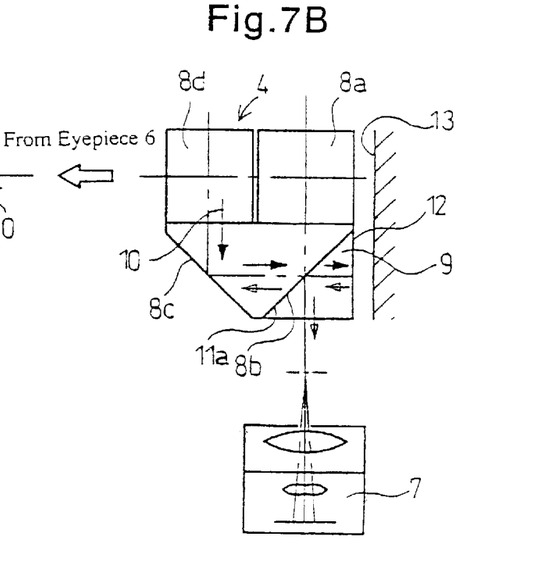

In this structure, as shown in FIGS. 7A and 7B, the external light 10 which enters the collimating optical system through the eyepiece 6 is received by the AF sensor 7 (focus detection device having a light receiving device) and overlaps the light from the objective lens 2, thus resulting in an incorrect focus detection. Namely, the external light 10 from the eyepiece 6 is reflected by the fourth reflection surface 8d and the third reflection surface 8c of the Porro prism 4 and the external light 10 transmitted through the beam splitting surface 11a is reflected by the side surface 12 of the prism 9 or is transmitted through the side surface 12 and is reflected by the barrel inner surface 13. The light is then transmitted through the side surface 12 and is reflected by the beam splitting surface 11a and is received by the AF sensor 7.

Figure 3:
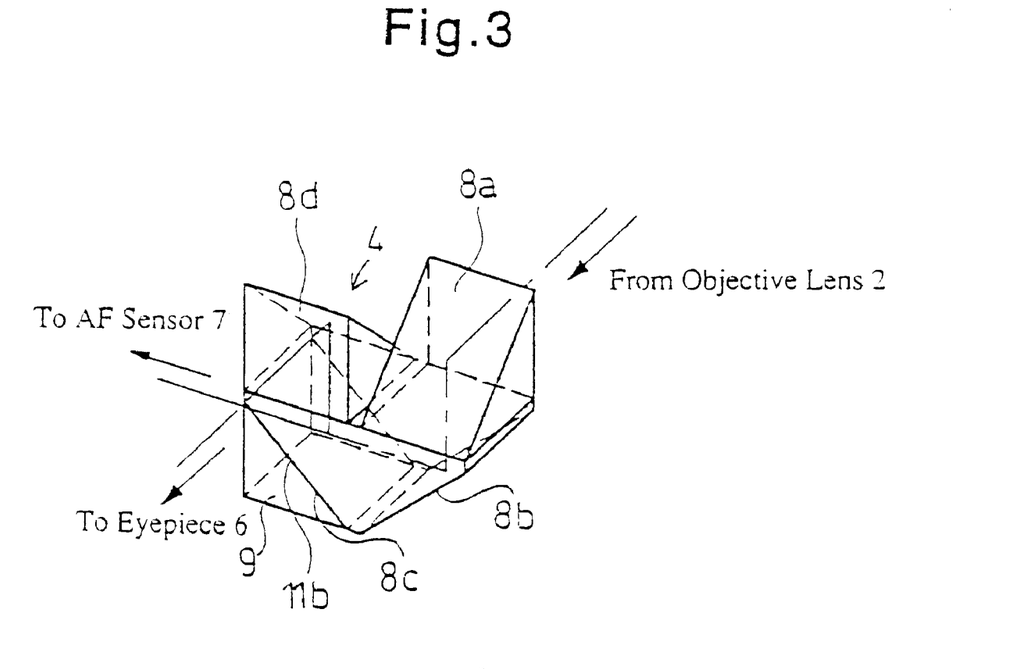
FIG. 3 is a perspective view of a Porro prism which is provided on its third reflection surface with a prism cemented thereto.
Figure 4:
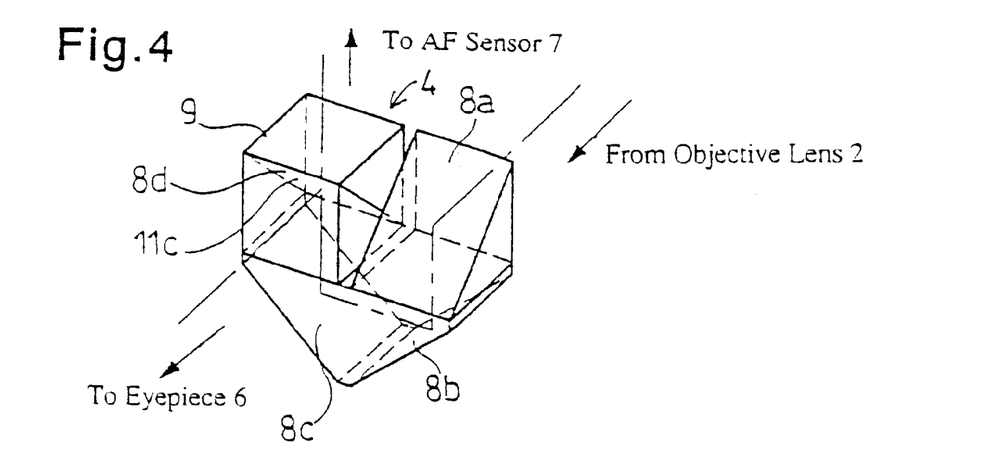
FIG. 4 is a perspective view of a Porro prism which is provided n its fourth reflection surface with a prism cemented thereto.
Figure 5:
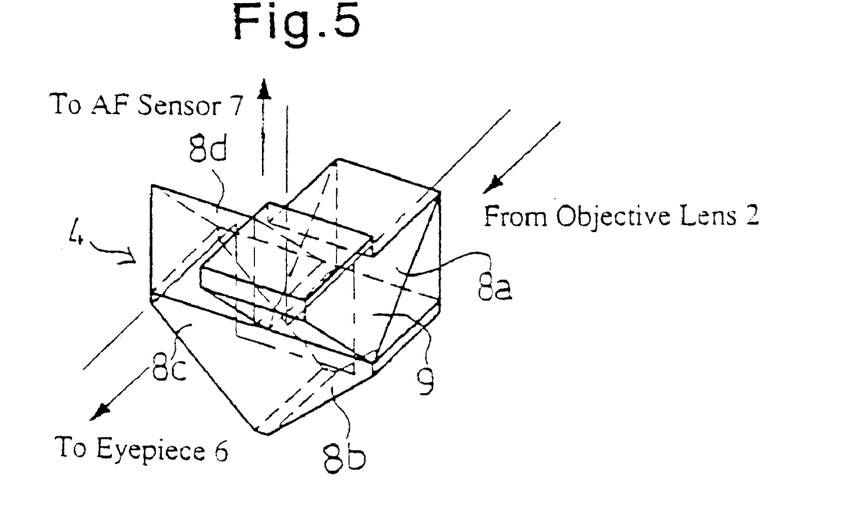
FIG. 5 is a perspective view of a Porro prism which is provided n its first reflection surface with a prism cemented thereto.
Figure 6:
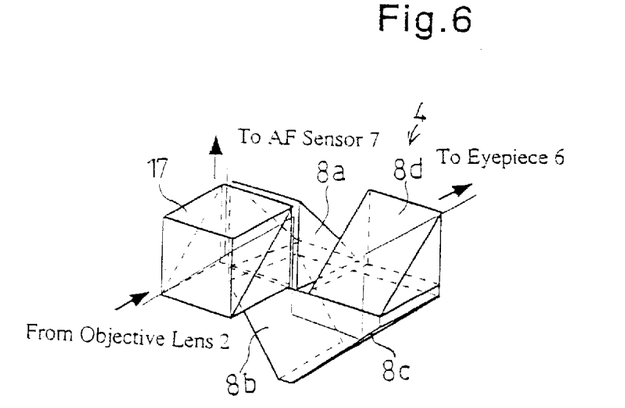
FIG. 6 is a perspective view of a Porro prism and a beam splitter located on the front side (objective lens side) thereof.

The above discussion has been directed to an arrangement in which the second reflection surface 8b of the Porro prism 4 defines the beam splitting surface. The same problem is raised if the beam splitting surface is defined by the reflection surface on any other reflection surface of the Porro prism 4 having four reflection surfaces, other than the second reflection surface. The different arrangements of the Porro prism 4 and the prism 9, in which the beam splitting surface is defined by the reflection surface of the Porro prism 4 other than the second reflection surface 8b are shown in FIGS. 3 through 5. Furthermore, the same problem occurs if the beam splitter 17 is provided at the front (on the objective lens side) or rear of the Porro prism 4 (FIG. 6).

Embodiments of the invention to solve the problem will be discussed below.

In a first embodiment, at least one specific surface of the prism 9 is a polished surface which can be subject to an anti-reflection treatment, such as an anti-reflection paint to prevent the external light 10 incident through the eyepiece 6 from reaching the AF sensor 7 due to the internal reflections shown in FIGS. 8 through 12. The external light 10 transmitted through the beam splitting surface 11a is diffused or absorbed by the polished surface with or without the anti-reflection treatment, so that the quantity of the external light 10 which can be received by the AF sensor 7 can be reduced. Examples of the specific surface of the prism 9 to be polished with or without the anti-reflection treatment in the first embodiment will be discussed below.

EXAMPLE 1

Figure 8:
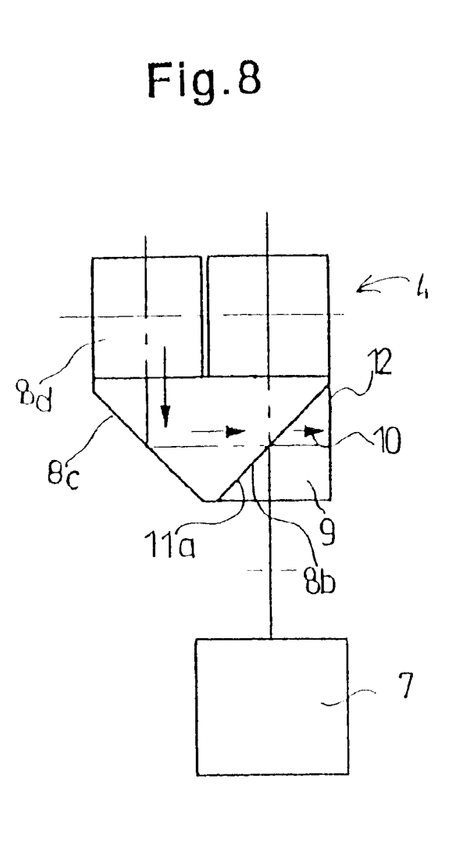
FIG. 8 is a view of an example 1 of an optical arrangement of a Porro prism, a prism, and an AF sensor according to a first embodiment of the present invention.

In the case that the beam splitting surface 11a is defined by the connection surface between the second reflection surface 8b of the Porro prism 4 and the prism 9 cemented thereto (FIG. 2), as shown in FIG. 8, the surface of the prism 9 upon which the external light 10 from the eyepiece 6 is first made incident after the light passes through the beam splitting surface 11a is the specific surface to be polished with or without the anti-reflection treatment, i.e., the side surface 12. Thus, a substantial part of the external light 10 incident upon the Porro prism 4 through the eyepiece 6 is reflected by the fourth reflection surface 8d and the third reflection surface 8c; passes through the beam splitting surface 11a; and is diffused or absorbed by the side surface 12. Consequently, the quantity of the external light 10 which is reflected by the side surface 12, is reflected by the beam splitting surface 11a, and is received by the AF sensor 7; can be markedly reduced.

EXAMPLE 2

Figure 9:
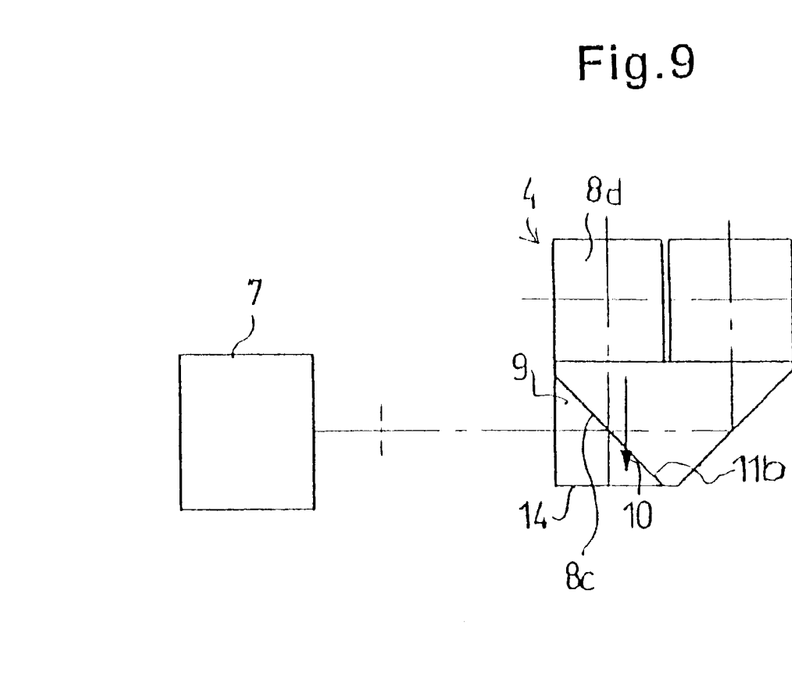
FIG. 9 is a view of an example 2 of an optical arrangement of a Porro prism, a prism, and an AF sensor according to a first embodiment of the present invention.

In the arrangement in which the beam splitting surface 11b is defined by the connection surface between the third reflection surface 8c of the Porro prism 4 and the prism 9 cemented thereto (FIG. 3), as shown in FIG. 9, the surface of the prism 9 upon which the external light 10 from the eyepiece 6 is first made incident after the light passes through the beam splitting surface 11b is the specific surface to be polished with or without the anti-reflection treatment, i.e., the side surface 14. Thus, a substantial part of the external light 10 incident upon the Porro prism 4 through the eyepiece 6 is reflected by the fourth reflection surface 8d and passes through the beam splitting surface 11a; and is diffused or absorbed by the side surface 14. Consequently, the quantity of the external light 10 which is reflected by the side surface 14, is reflected by the beam splitting surface 11b, and is received by the AF sensor 7; can be markedly reduced.

EXAMPLE 3

Figure 10:
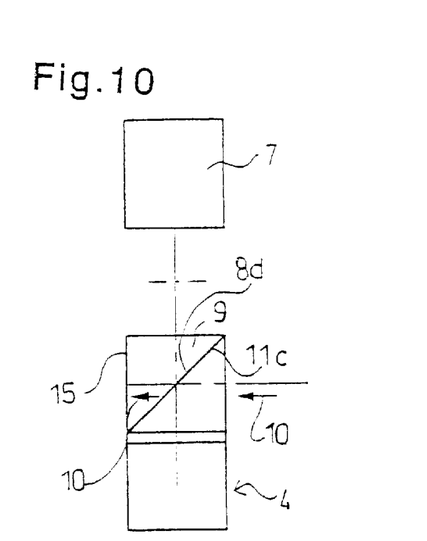
FIG. 10 is a view of an example 3 of an optical arrangement of a Porro prism, a prism, and an AF sensor according to a first embodiment of the present invention.

In the arrangement in which the beam splitting surface 11c is defined by the connection surface between the fourth reflection surface 8d of the Porro prism 4 and the prism 9 cemented thereto (FIG. 4), as shown in FIG. 10, the surface of the prism 9 upon which the external light 10 from the eyepiece 6 is first made incident after the light passes through the beam splitting surface 11c is the specific surface to be polished with or without the anti-reflection treatment, i.e., the side surface 15. In this arrangement, a substantial part of the external light 10 incident upon the Porro prism 4 through the eyepiece 6 is made incident upon the prism 9; passes through the beam splitting surface 11c; and is diffused or absorbed by the side surface 15. Thus, the quantity of the external light 10 which is reflected by the side surface 15; is reflected by the beam splitting surface 11c; and is received by the AF sensor 7 can be markedly reduced.

EXAMPLE 4

Figure 11:
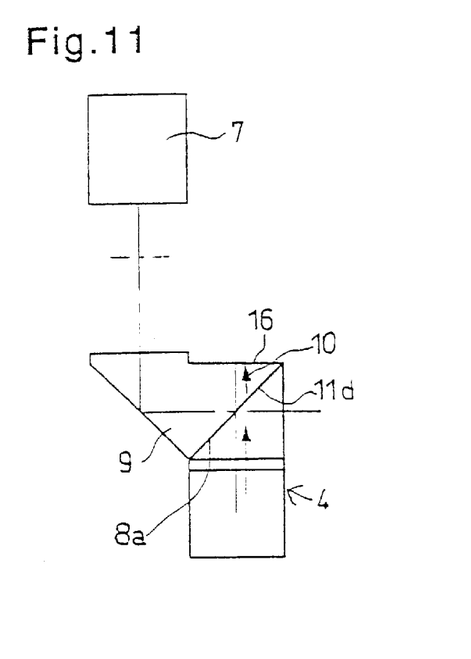
FIG. 11 is a view of an example 4 of an optical arrangement of a Porro prism, a prism, and an AF sensor according to a first embodiment of the present invention.

In the arrangement in which the beam splitting surface 11d is defined by the connection surface between the first reflection surface 8a of the Porro prism 4 and the prism 9 cemented thereto (FIG. 5), as shown in FIG. 11, the surface 16 of the prism 9 upon which the external light 10 from the eyepiece 6 is first made incident after the light passes through the beam splitting surface 11d is the specific surface to be polished with or without the anti-reflection treatment. In this example, a substantial part of the external light 10 incident upon the Porro prism 4 through the eyepiece 6 is reflected by the fourth reflection surface 8d, the third reflection surface 8c and the second reflection surface 8b; passes through the beam splitting surface 11d; and is diffused or absorbed by the side surface 16. Consequently, the quantity of the external light 10 which is reflected by the side surface 16, is reflected by the beam splitting surface 11d, and is received by the AF sensor 7, can be markedly reduced.

EXAMPLE 5

Figure 12:
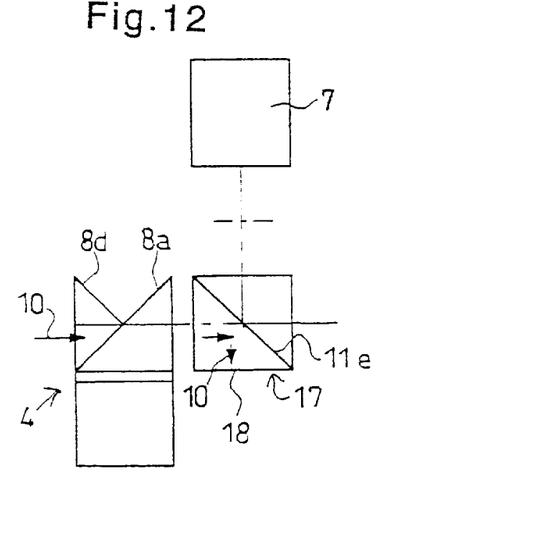
FIG. 12 is a view of an example 5 of an optical arrangement a Porro prism, a prism, and an AF sensor according to a first embodiment of the present invention.

In the arrangement in which the beam splitter 17 is provided on the front side (objective lens side) of the Porro prism (FIG. 6), as shown in FIG. 12, the surface 18 of the beam splitter 17 upon which the external light 10 from the eyepiece 6 is first made incident after the light is reflected by the beam splitting surface 11e is the specific surface to be polished with or without the anti-reflection 10 treatment. In this example, a substantial part of the external light 10 incident upon the Porro prism 4 through the eyepiece 6 is reflected by the fourth reflection surface 8d, the third reflection surface 8c, the second reflection surface 8b and the first reflection surface 8a; is made incident upon the beam splitter 17, is reflected by the beam splitting surface 11e, and is diffused or absorbed by the side surface 18. Consequently, the quantity of the external light 10 which is reflected by the beam splitting surface 11e or is transmitted through the beam splitting surface 11e and is returned to the beam splitting surface 11e to pass therethrough or to be reflected thereby, and is received by the AF sensor 7, can be markedly reduced. This example can be equally applied to an arrangement in which the beam splitter 17 is located on the rear side of the Porro prism 4.

In a second embodiment, one specific surface of the prism 9 is coated with an anti-reflection layer 19 to pass the external light 10 therethrough and the inner surface of the barrel opposed to the specific surface of the prism is provided with an anti-reflection surface 20, as shown in FIGS. 13 through 17. The anti-reflection surface can be made of, for example, (light absorbent) artificial fur member, sponge member, molt plane, fabric, cloth, or felt applied to the surface or anti-reflection paint, etc. The external light 10 transmitted through the beam splitting surface 11 passes through the anti-reflection surface (coat) 19 of the prism 9 and is emitted outward therefrom, and is absorbed by the barrel inner surface which is provided with the anti-reflection surface 20, so that the quantity of the external light 10 reflected by the anti-reflection surface 19 and 20 and received by the AF sensor 7, can be markedly reduced. Examples of the specific surface which is subject to the above-mentioned surface treatment in the second embodiment will be discussed below.

EXAMPLE 1

Figure 13:
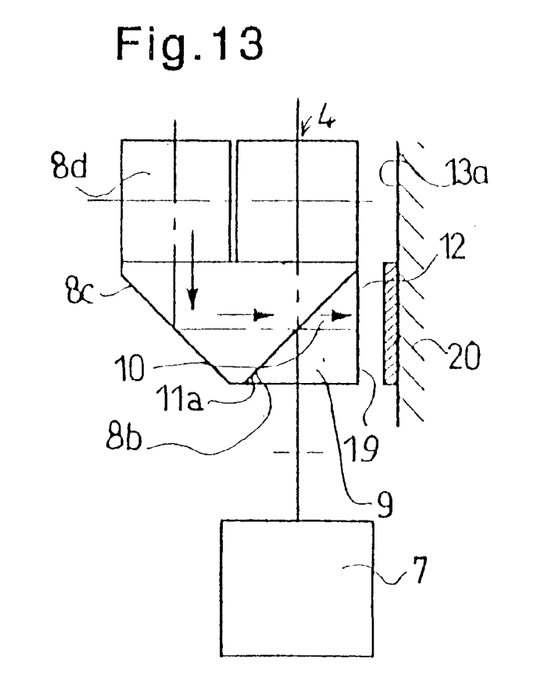
FIG. 13 is a view of an example 1 of an optical arrangement of a Porro prism, a prism, and an AF sensor according to a second embodiment of the present invention.

In the arrangement in which the beam splitting surface 11a is defined by the connection surface between the second reflection surface 8b of the Porro prism 4 and the prism 9 cemented thereto (FIG. 2), as shown in FIG. 13, the side surface 12 of the prism 9 upon which the external light 10 from the eyepiece 6 is first made incident after the light passes through the beam splitting surface 11a is coated with the anti-reflection layer 19, and the barrel inner surface 13a opposed thereto and outside the prism 9 is provided with the anti-reflection surface 20. Thus, a substantial part of the external light 10 incident upon the Porro prism 4 through the eyepiece 6 is reflected by the fourth reflection surface 8d and the third reflection surface 8c, passes through the beam splitting surface 11a, passes through the side surface 12; and is absorbed by the anti-reflection surface 20 of the barrel inner surface 13a. Consequently, the quantity of the external light 10 received by the AF sensor 7 can be markedly reduced.

EXAMPLE 2

Figure 14:
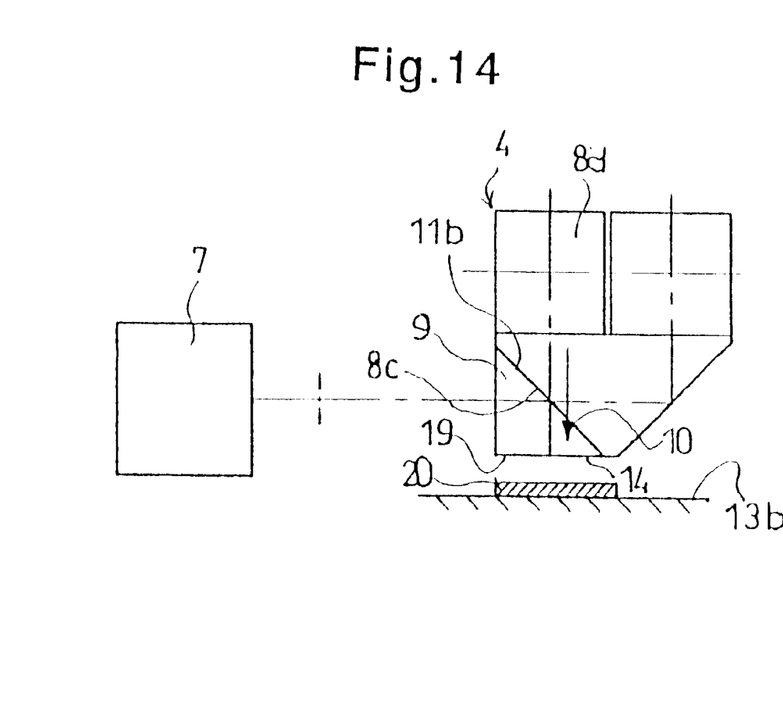
FIG. 14 is a view of an example 2 of an optical arrangement of a Porro prism, a prism, and an AF sensor according to a second embodiment of the present invention.

In the arrangement in which the beam splitting surface 11b is defined by the connection surface between the third reflection surface 8c of the Porro prism 4 and the prism 9 cemented thereto (FIG. 3), as shown in FIG. 14, the side surface 14 of the prism 9 upon which the external light 10 from the eyepiece 6 is first made incident after the light passes through the beam splitting surface 11b is coated with the anti-reflection layer 19; and the barrel inner surface 13b opposed thereto is provided with the anti-reflection surface 20. Thus, since a substantial part of the external light 10 incident upon the Porro prism 4 through the eyepiece 6 is reflected by the fourth reflection surface 8d, passes through the beam splitting surface 11b, passes through the side surface 14; and is absorbed by the anti-reflection surface 20 of the barrel inner surface 13b, the quantity of the external light 10 reaching the AF sensor 7 can be markedly reduced.

EXAMPLE 3

Figure 15:
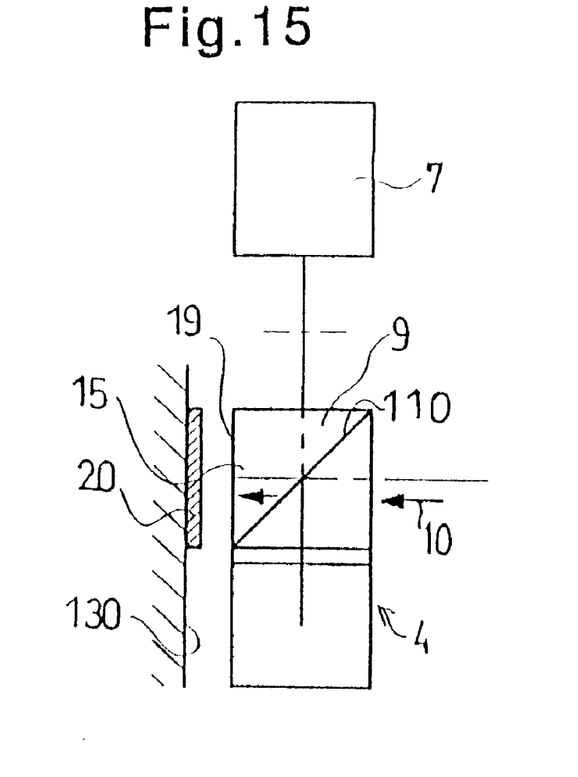
FIG. 15 is a view of an example 3 of an optical arrangement of a Porro prism, a prism, and an AF sensor according to a second embodiment of the present invention.

In the arrangement in which the beam splitting surface 11c is defined by the connection surface between the fourth reflection surface 8d of the Porro prism 4 and the prism 9 cemented thereto (FIG. 4), as shown in FIG. 15, the side surface 15 of the prism 9 upon which the external light 10 from the eyepiece 6 is first made incident after the light passes through the beam splitting surface 11c is coated with the anti-reflection layer 19, and the barrel inner surface 13c opposed thereto is provided with the anti-reflection surface 20. A substantial part of the external light 10 incident upon the Porro prism 4 through the eyepiece 6 is transmitted through the beam splitting surface 11c; passes through the side surface 15; and is absorbed by the anti-reflection surface 20 of the barrel inner surface 13c. Consequently, the quantity of the external light 10 received by the AF sensor 7 can be markedly reduced.

EXAMPLE 4

Figure 16:
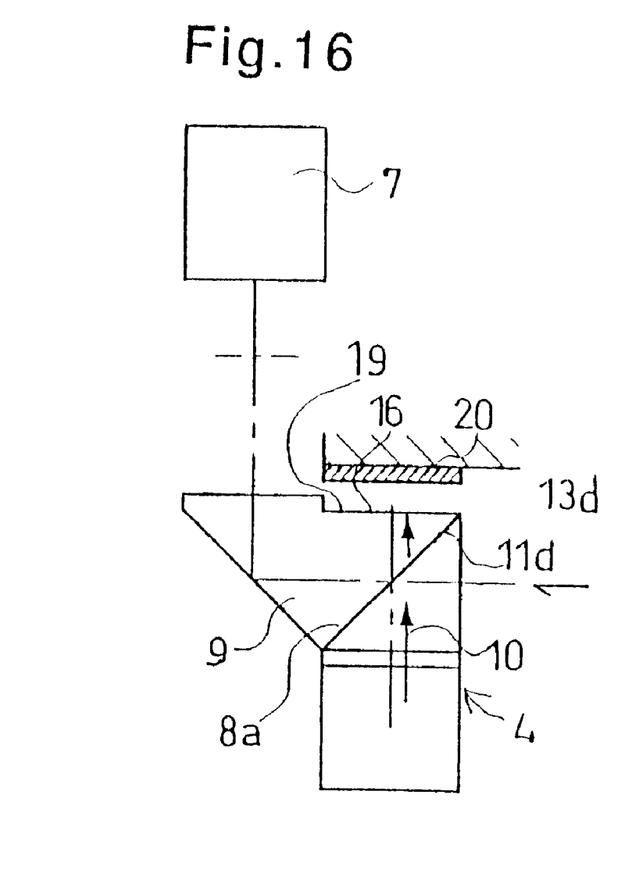
FIG. 16 is a view of an example 4 of an optical arrangement of a Porro prism, a prism, and an AF sensor according to a second embodiment of the present invention.

In the arrangement in which the beam splitting surface 11d is defined by the connection surface between the first reflection surface 8a of the Porro prism 4 and the prism 9 cemented thereto (FIG. 5), as shown in FIG. 16, the side surface 16 of the prism 9 upon which the external light 10 from the eyepiece 6 is first made incident after the light passes through the beam splitting surface 11d is coated with the anti-reflection layer 19, and the barrel inner surface 13d opposed thereto is provided with the anti-reflection surface 20. A substantial part of the external light 10 10 incident upon the Porro prism 4 through the eyepiece 6 is reflected by the fourth reflection surface 8d, the third reflection surface 8c and the second reflection surface 8b, passes through the beam splitting surface 11d, passes through the side surface 16, and is absorbed by the anti-reflection surface 20 of the barrel inner surface 13d. Consequently, the quantity of the external light 10 received by the AF sensor 7 can be markedly reduced.

EXAMPLE 5

Figure 17:
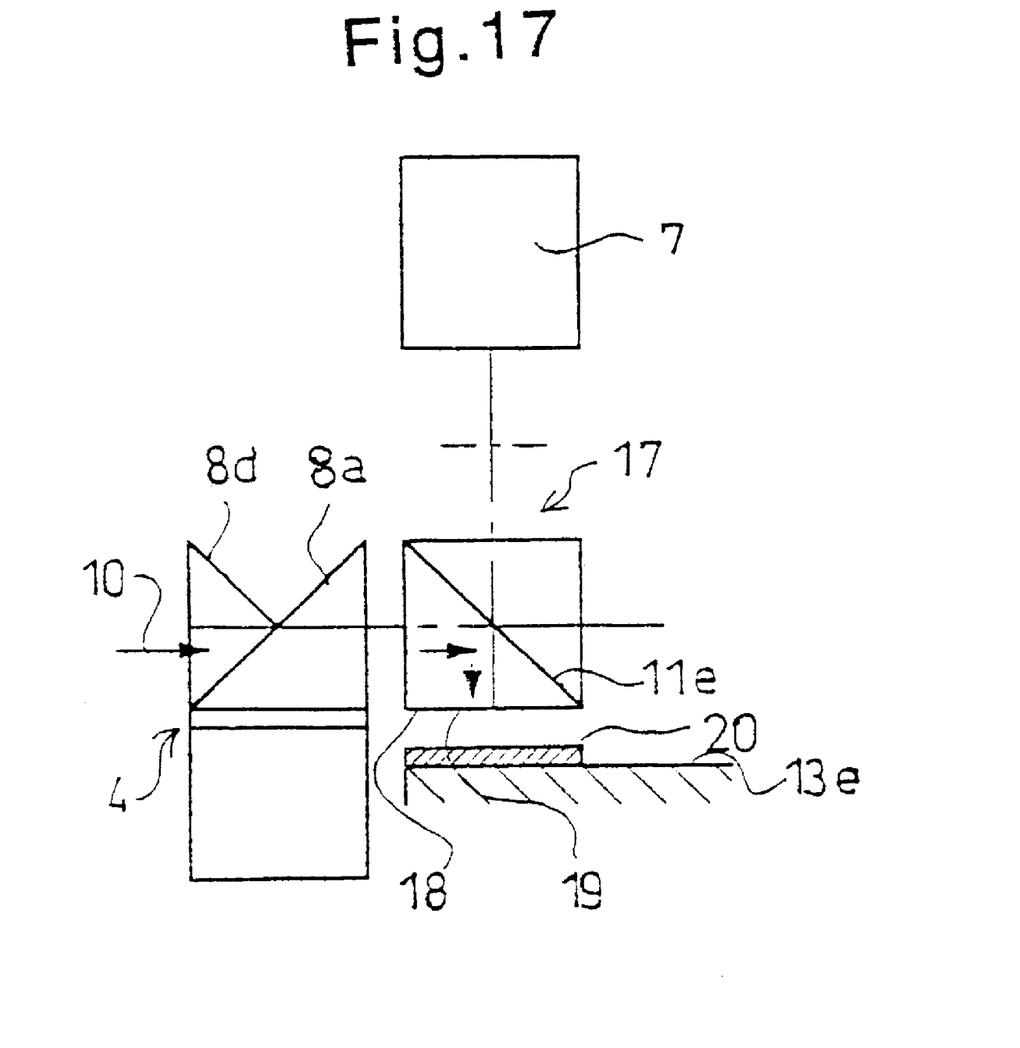
FIG. 17 is a view of an example 5 of an optical arrangement of a Porro prism, a prism, and an AF sensor according to a second embodiment of the present invention.

In the arrangement in which the beam splitter 17 is provided on the front side (objective lens side) of the Porro prism (FIG. 6), as shown in FIG. 17, the side surface 18 of the beam splitter 17 upon which the external light 10 from the eyepiece 6 is first made incident after the light is reflected by the beam splitting surface 11e is coated with the anti-reflection layer 19, and the barrel inner surface 13e opposed thereto is provided with the anti-reflection surface 20. A substantial part of the external light 10 incident upon the Porro prism 4 through the eyepiece 6 is reflected by the fourth reflection surface 8d, the third reflection surface 8c, the second reflection surface 8b and the first reflection surface 8a; is made incident upon the beam splitter 17, is reflected by the beam splitting surface 11e, passes through the side surface 18, and is absorbed by the barrel inner surface 13e. Consequently, the quantity of the external light 10 reflected by the beam splitting surface 11e, or transmitted through the beam splitting surface 11e and returned again to the beam splitting surface 11e to pass therethrough or to be reflected thereby, and received by the AF sensor 7 can be markedly reduced. The above discussion can be equally applied if the beam splitter 17 is provided on the rear side of the Porro prism 4.

In a third embodiment which is a modification of the second embodiment, one specific surface of the prism 9 is coated with an anti-reflection layer 19, and the inner surface of the barrel opposed to the specific surface of the prism 9 and outside the prism 9 forms a predetermined angle with respect to the specific surface of the prism 9, as shown in FIGS. 18 through 22. The quantity of the external light 10 transmitted through the beam splitting surface 11 and reflected by the anti-reflection surface (coat) 19 of the prism 9 can be reduced. Moreover, the external light 10 transmitted through the anti-reflection surface 19 and reflected by the barrel inner surface travels in a direction deviated from the light path toward the anti-reflection coat 19 or the prism 9, due to the angle of the barrel inner surface with respect to the anti-reflection coat 19. The predetermined angle of the barrel inner surface is such that no external light 10 reflected by the barrel inner surface is made incident again upon the prism 9. Examples of the specific surface which is subject to the above-mentioned surface treatment in the third embodiment will be discussed below.

EXAMPLE 1

Figure 18:
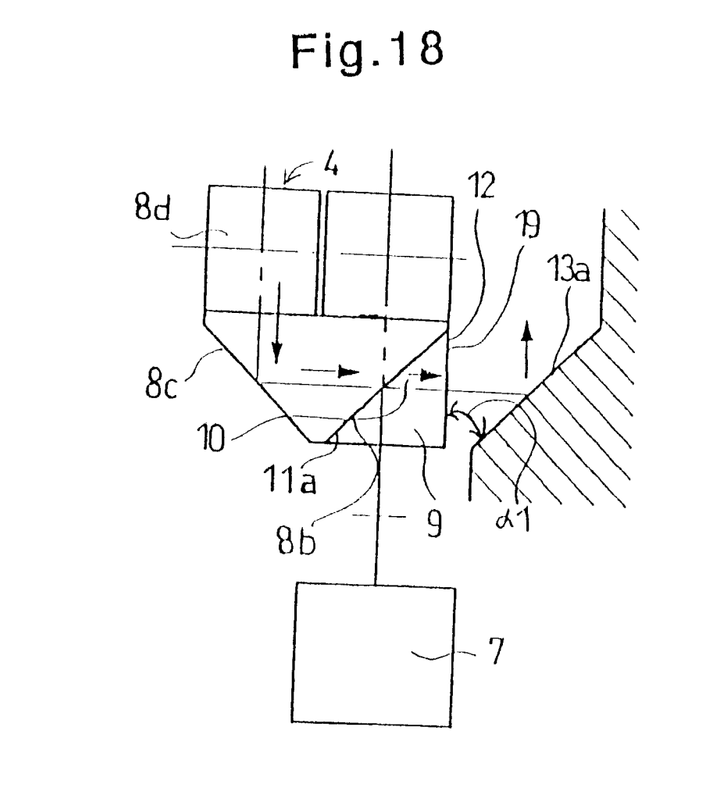
FIG. 18 is a view of an example 1 of an optical arrangement of a Porro prism, a prism, and an AF sensor according to a third embodiment of the present invention.

In the arrangement in which the beam splitting surface 11a is defined by the connection surface between the second reflection surface 8b of the Porro prism 4 and the prism 9 cemented thereto (FIG. 2), as shown in FIG. 18, the side surface 12 of the prism 9 upon which the external light 10 from the eyepiece 6 is first made incident after the light passes through the beam splitting surface 11a is coated with the anti-reflection layer 19, and the barrel inner surface 13a opposed thereto forms an angle $\alpha 1$ with respect to the side surface 12. Thus, a substantial part of the external light 10 incident upon the Porro prism 4 through the eyepiece 6 is reflected by the fourth reflection surface 8d and the third reflection surface 8c, passes through the beam splitting surface 11a, passes through the side surface 12, and is reflected by the barrel inner surface 13a in a direction away from the prism 9. Consequently, the quantity of the external light 10 received by the AF sensor 7 can be markedly reduced.

EXAMPLE 2

Figure 19:
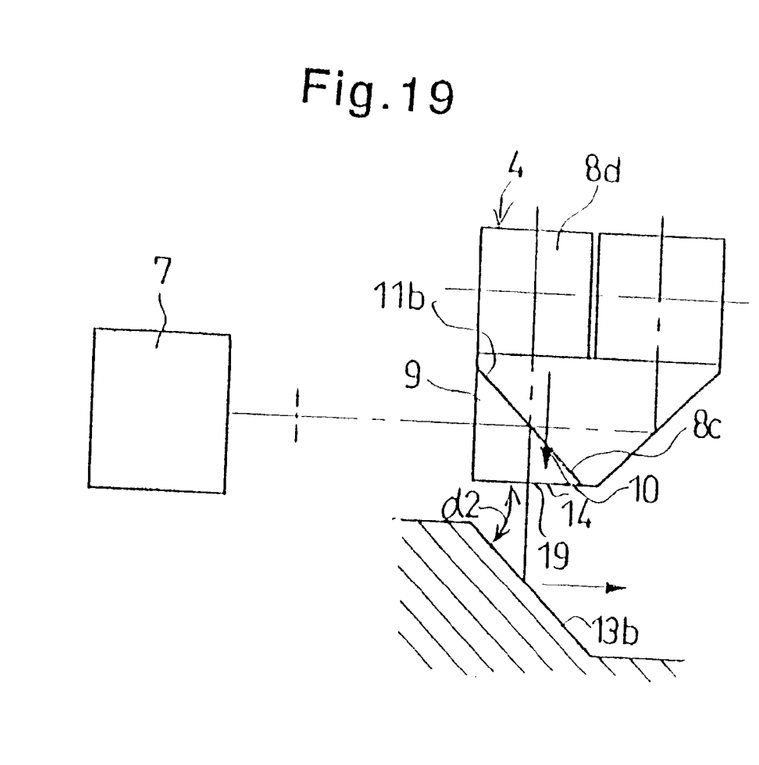
FIG. 19 is a view of an example 2 of an optical arrangement of a Porro prism, a prism, and an AF sensor according to a third embodiment of the present invention.

In the arrangement in which the beam splitting surface 11b is defined by the connection surface between the third reflection surface 8c of the Porro prism 4 and the prism 9 cemented thereto (FIG. 3), as shown in FIG. 19, the side surface 14 of the prism 9 upon which the external light 10 from the eyepiece 6 is first made incident after the light passes through the beam splitting surface 11b is coated with the anti-reflection layer 19, and the barrel inner surface 13b opposed thereto forms an angle $\alpha 2$ with respect to the side surface 14. Thus, a substantial part of the external light 10 incident upon the Porro prism 4 through the eyepiece 6 is reflected by the fourth reflection surface 8d, passes through the beam splitting surface 11b, passes through the side surface 14, and is reflected by the barrel inner surface 13b in a direction away from the prism 9. Consequently, the quantity of the external light 10 received by the AF sensor 7 can be markedly reduced.

EXAMPLE 3

Figure 20:
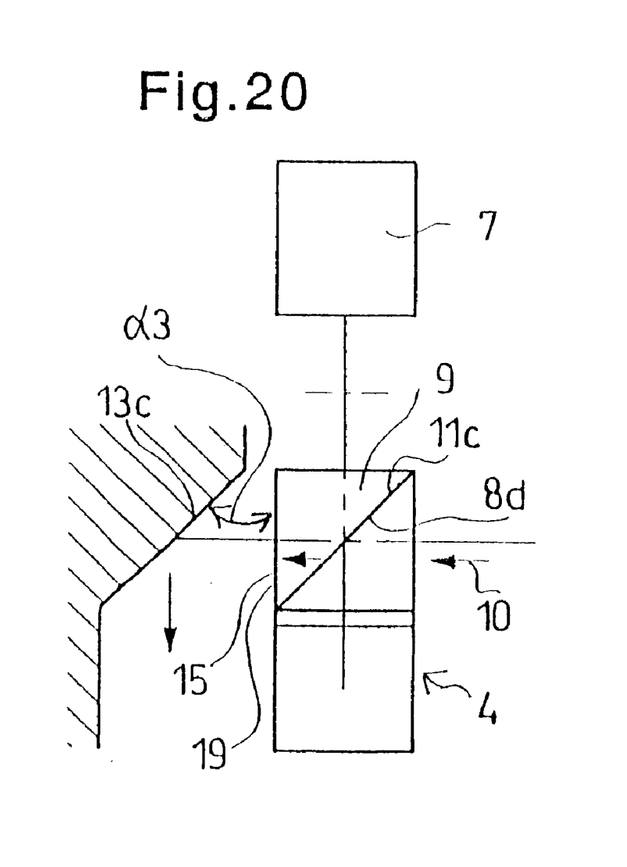
FIG. 20 is a view of an example 3 of an optical arrangement of a Porro prism, a prism, and an AF sensor according to a third embodiment of the present invention.

In the arrangement in which the beam splitting surface 11b is defined by the connection surface between the fourth reflection surface 8d of the Porro prism 4 and the prism 9 cemented thereto (FIG. 4), as shown in FIG. 20, the side surface 15 of the prism 9 upon which the external light 10 from the eyepiece 6 is first made incident after the light passes through the beam splitting surface 11c is coated with the anti-reflection layer 19, and the barrel inner surface 13c opposed thereto forms an angle α3 with respect to the side surface 15. Thus, a substantial part of the external light 10 incident upon the Porro prism 4 through the eyepiece 6 passes through the beam splitting surface 11c, passes through the side surface 15, and is reflected by the barrel inner surface 13c in a direction away from the prism 9. Consequently, the quantity of the external light 10 received by the AF sensor 7 can be markedly reduced.

EXAMPLE 4

Figure 21:
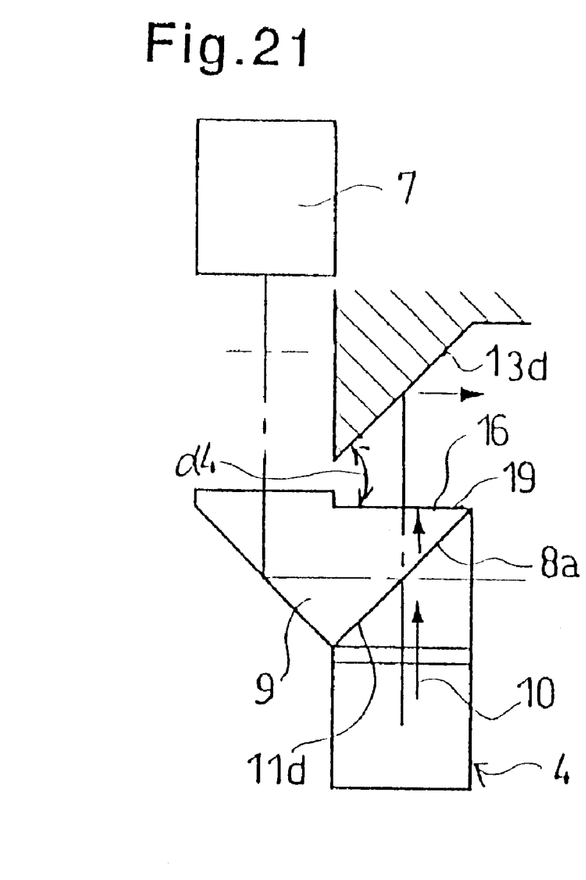
FIG. 21 is a view of an example 4 of an optical arrangement a Porro prism, a prism, and an AF sensor according to a third embodiment of the present invention.

In the arrangement in which the beam splitting surface 11b is defined by the connection surface between the first reflection surface 8a of the Porro prism 4 and the prism 9 cemented thereto (FIG. 5), as shown in FIG. 21, the side surface 16 of the prism 9 upon which the external light 10 from the eyepiece 6 is first made incident after the light passes through the beam splitting surface 11d is coated with the anti-reflection layer 19, and the barrel inner surface 13d opposed thereto forms an angle α4 with respect to the side surface 16. A substantial part of the external light 10 incident upon the Porro prism 4 through the eyepiece 6 is reflected by the fourth reflection surface 8d, the third reflection surface 8c and the second reflection surface 8b; passes through the beam splitting surface 11d, passes through the side surface 16, and is reflected by the barrel inner surface 13d in a direction away from the prism 9. Consequently, the quantity of the external light 10 received by the AF sensor 7 can be markedly reduced.

EXAMPLE 5

Figure 22:
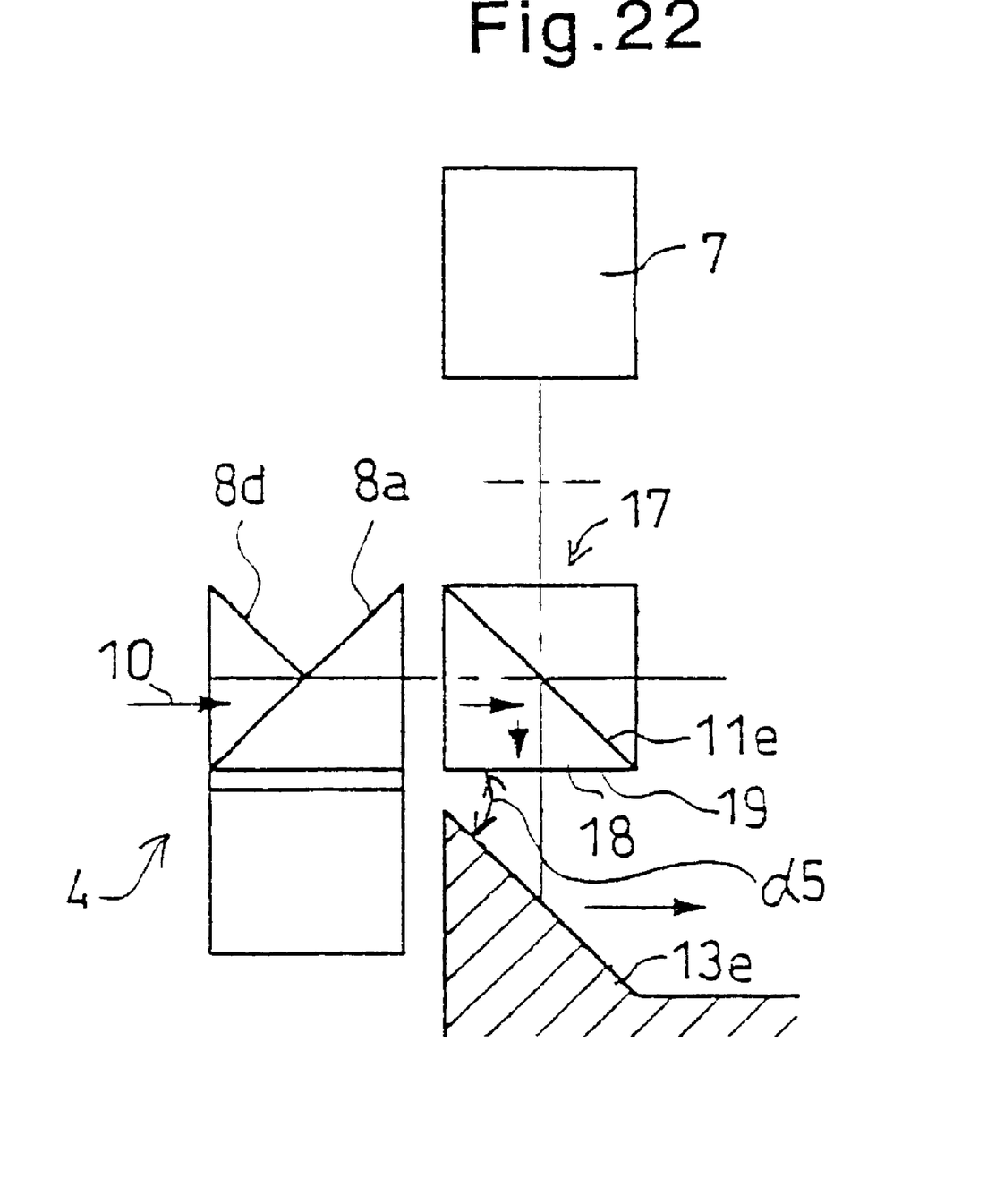
FIG. 22 is a view of an example 5 of an optical arrangement of a Porro prism, a prism, and an AF sensor according to third embodiment of the present invention.

In the arrangement in which the beam splitter 17 is provided on the front side (objective lens side) of the Porro prism (FIG. 6), as shown in FIG. 22, the side surface 18 of the beam splitter 17 upon which the external light 10 from the eyepiece 6 is first made incident after the light is reflected by the beam splitting surface 11e is coated with the anti-reflection layer 19, and the barrel inner surface 13e opposed thereto forms an angle α5 with respect to the side surface 18. A substantial part of the external light 10 incident upon the Porro prism 4 through the eyepiece 6 is reflected by the fourth reflection surface 8d, the third reflection surface 8c, the second reflection surface 8b and the first reflection surface 8a; is made incident upon the beam splitter 17, is reflected by the beam splitting surface 11e, passes through the side surface 18, and is reflected by the barrel inner surface 13e in a direction away from the beam splitter 17. Consequently, the quantity of the external light 10 reflected by the beam splitting surface 11e or transmitted through the beam splitting surface 11e and returned again to the beam splitting surface 11e to pass therethrough or to be reflected thereby, and received by the AF sensor 7, can be markedly reduced. The above discussion can be equally applied if the beam splitter 17 is provided on the rear side of the Porro prism 4.

As can be understood from the above discussion, according to the present invention, since no external light entering the telescopic optical system through the ocular optical system reaches the focus detection device due to the internal reflections, the external light does not interfere with the object light from the objective optical system, thus resulting in a precise AF operation.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A light interception structure for an automatic focus detection surveying instrument comprising:

a telescopic optical system having an objective optical system and an ocular optical system;

a beam splitting optical element which splits objective light transmitted through the objective optical system of the telescopic optical system, said beam splitting optical element including a splitting surface; and a focus detection device having a light receiving device for receiving light split by the beam splitting optical element;

wherein one surface of the beam splitting optical element is provided with an anti-reflection treatment, said one surface comprising a surface upon which external light entering the telescopic optical system through the ocular optical system is first incident after passing through or being reflected by the beam splitting surface of the beam splitting optical element, said beam splitting optical element comprising a Porro prism with a prism attached to a reflection surface of said Porro prism, a boundary between said Porro prism and said prism comprising said splitting surface.

2. A light interception structure for an automatic focus detection surveying instrument according to claim 1, wherein said anti-reflection treatment that provides light diffusion is surface polishing.

3. A light interception structure for an automatic focus detection surveying instrument according to claim 1, wherein the surface of the beam splitting optical element which is subject to the anti-reflection treatment is coated with an anti-reflection paint.

4. A light interception structure for an automatic focus detection surveying instrument comprising:

a telescopic optical system having an objective optical system and an ocular optical system;

a beam splitting optical element which splits object light transmitted through the objective optical system of the telescopic optical system; and a focus detection device having a light receiving device for receiving the object light split by the beam splitting optical element;

wherein a predetermined surface of said beam splitting optical element includes an anti-reflection layer, and an inner surface of a housing of said surveying instrument adjacent to said predetermined surface includes an anti-reflection treatment, said predetermined surface comprising a first surface onto which external light entering said telescopic optical system through said ocular optical system is incident after passing through or being reflected by said splitting surface.

5. The light interception structure for an automatic focus detection surveying system according to claim 4, wherein external light entering the telescopic optical system through said ocular optical system passes through or is reflected by the beam splitting surface, passes through the predetermined surface, is emitted from the anti-reflection layer of the predetermined surface, and is absorbed by the anti-reflection treatment of said inner surface.

6. The light interception structure for automatic focus detecting surveying instrument according to claim 4, said beam splitting optical element comprising a Porro prism with a prism attached to a reflection surface of said Porro prism, a boundary between said Porro prism and said prism comprising said beam splitting surface.

7. The light interception structure for an automatic focus detection surveying instrument according to claim 4, said one surface of said beam splitting optical element comprising a second reflection surface of said beam splitting optical element for light from said objective optical system.

8. A light interception structure for an automatic focus detection surveying instrument according to claim 4, wherein said anti-reflection treatment comprises a fabric, cloth or felt to applied the surface.

9. A light interception structure for an automatic focus detection surveying instrument according to claim 4, wherein said anti-reflection treatment comprises a molt plane or a sponge member applied to the surface.

10. A light interception structure for an automatic focus detection surveying instrument according to claim 4, wherein said anti-reflection treatment comprises an anti-reflection paint coating.

11. A light interception structure for an automatic focus detection surveying instrument comprising:
- a telescopic optical system having an objective optical system and an ocular optical system;
- a beam splitting optical element which splits object light transmitted through the objective optical system of the telescopic optical system said beam splitting optical element including a splitting surface; and
- a focus detection device having a light receiving device for receiving the object light split by the beam splitting optical element;
- wherein a predetermined surface of said beam splitting optical element includes an anti-reflection layer, said predetermined surface comprising a first surface onto which external light entering said telescopic optical system through said ocular optical system is incident after passing through or being reflected by said splitting surface, an inner surface of a housing of said surveying instrument adjacent to said predetermined surface being positioned at a predetermined angle with respect to said predetermined surface so that light emitted from said predetermined surface of said beam splitting optical element is reflected to not be incident on said predetermined surface.

12. The light interception structure for an automatic focus detection surveying instrument according to claim 11, wherein external light entering the telescopic optical system through said ocular optical system passes through or is reflected by the splitting surface, passes through the predetermined surface, is emitted from the anti-reflection layer of the predetermined surface and is reflected by said inner surface away from said predetermined surface.

13. The light interception structure for an automatic focus detecting surveying instrument according to claim 11, said beam splitting optical element comprising a Porro prism with a prism attached to a reflection surface of said Porro prism, a boundary between said Porro prism and said prism comprising said beam splitting surface.

14. The light interception structure for an automatic focus detection surveying instrument according to claim 11, said one surface of said beam splitting optical element comprising a second reflection surface of said beam splitting optical element for light from said objective optical system.

15. A light interception structure for an automatic focus detection surveying instrument comprising:
- a telescopic optical system having an objective optical system and an ocular optical system;
- a beam splitting optical element which splits object light transmitted through the objective optical system from the telescopic optical system, said beam splitting optical system including a splitting surface;
- a focus detection device having a light receiving device for receiving the object light split by the beam splitting optical system; and
- an inner surface of a housing of the automatic focus detection surveying instrument that is adjacent to a surface of said beam splitting optical element onto which light entering said telescopic optical system through said ocular optical system is first made incident after passing through or being reflected by said splitting surface is one of provided with an anti-reflection treatment and positioned so as to reflect incident light away from said splitting surface.

16. The light interception structure for an automatic focus detection surveying instrument according to claim 15, said inner surface being positioned at an angle with respect to said splitting surface of said beam splitting optical element such that external light entering said telescopic optical system through said ocular optical system is reflected by the inner surface of the housing to not be incident onto the splitting surface.

17. A light interception structure for an automatic focus detection surveying instrument comprising:
- a telescopic optical system having an objective optical system and an ocular optical system;
- a beam splitting optical element which splits objective light transmitted through the objective optical system of the telescopic optical system, said beam splitting optical element including a splitting surface; and
- a focus detection device having a light receiving device for receiving light split by the beam splitting optical element;
- wherein one surface of the beam splitting optical element is provided with an anti-reflection treatment, said one surface comprising a surface upon which external light entering the telescopic optical system through the ocular optical system is first incident after passing through or being reflected by the beam splitting surface of the beam splitting optical element,
- said one surface of said beam splitting optical element comprising a second reflection surface of said beam splitting optical element for light from said objective optical system.

* * * * *